Oct. 1, 1946.                J. J. MOYNIHAN                2,408,472
        ELECTRICAL SYSTEM FOR THE CONTROL OF MECHANICAL DEVICES
                   Filed Aug. 28, 1941          2 Sheets-Sheet 2
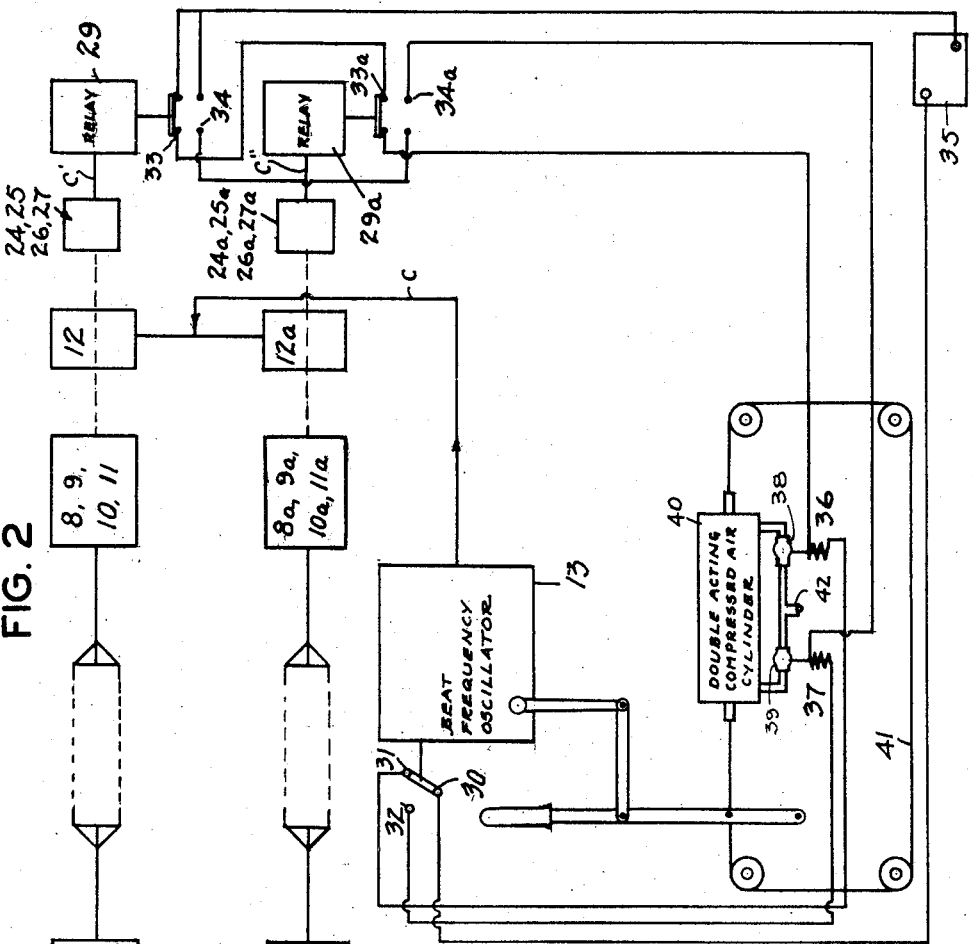
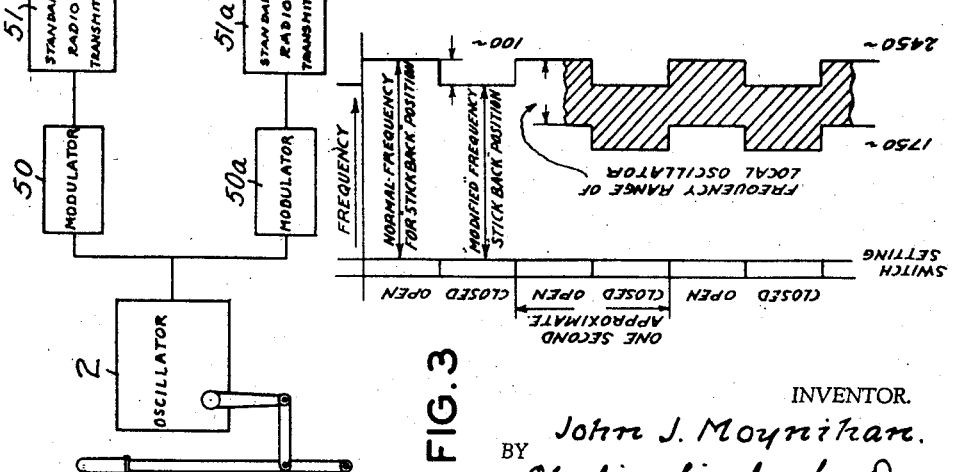
INVENTOR.
John J. Moynihan.
BY Oberlin, Limbach + Day
ATTORNEYS.

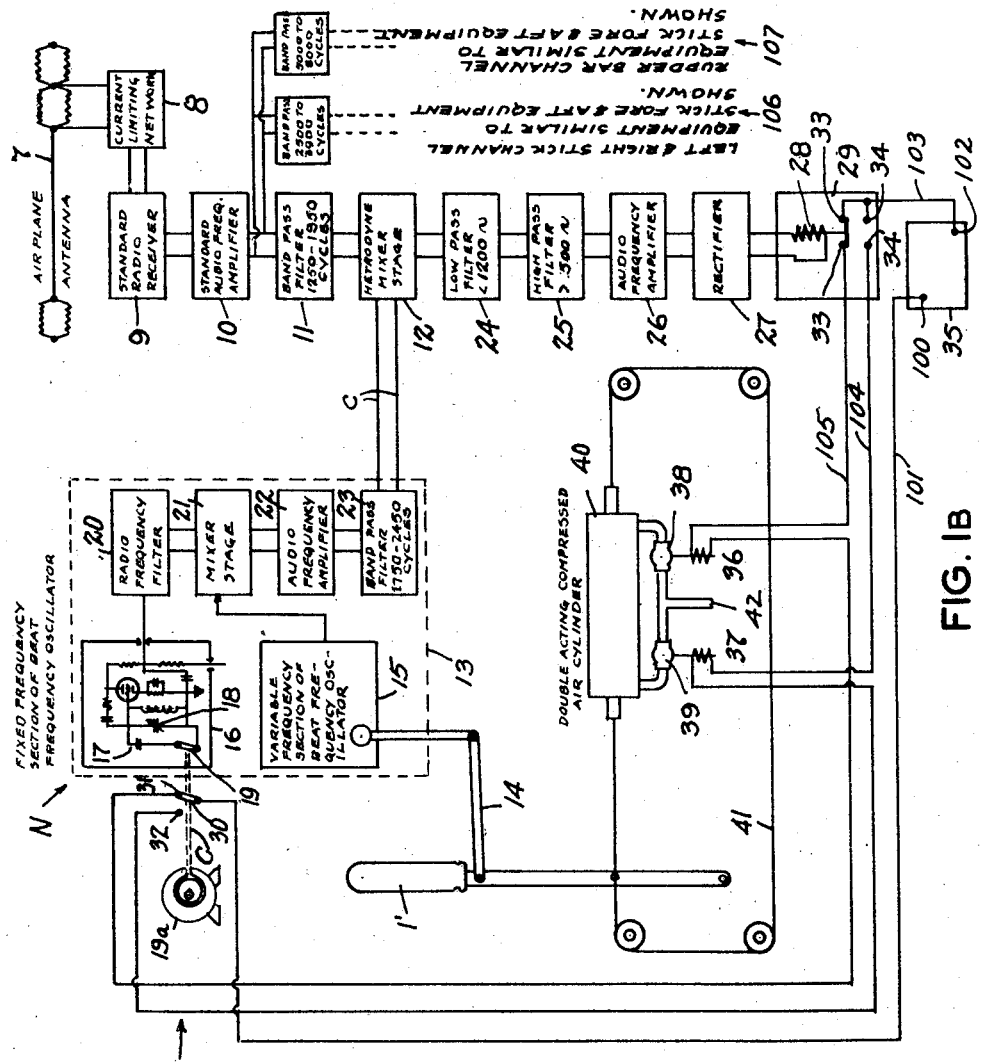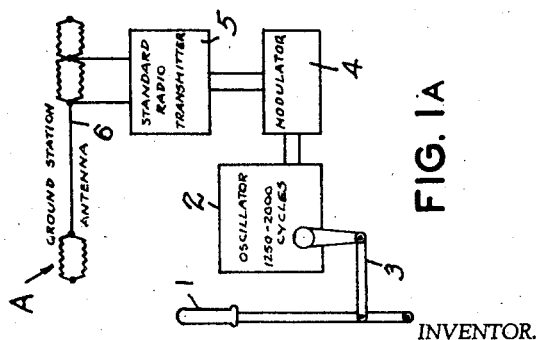

Patented Oct. 1, 1946

2,408,472

UNITED STATES PATENT OFFICE 2,408,472

ELECTRICAL SYSTEM FOR THE CONTROL OF MECHANICAL DEVICES

John J. Moynihan, Boston, Mass., assignor of one-half to Joseph B. Brennan, Cleveland, Ohio Application August 28, 1941, Serial No. 408,658

19 Claims. (Cl. 250—2)

This invention relates as indicated to control devices, and more especially to a novel method and apparatus for the comparison of commensurable properties of a plurality of entities, such comparison being accomplished by cyclically varying a parameter of one such, and determining whether the parameter of the other lies within the range of such variation. Not only does this invention relate to such method and apparatus for making the comparison, but it also provides an improved method and apparatus for so changing one of the variables, when upon comparison in the mode stated it is found to lie outside of said range of variation, as to bring it within such range.

This invention has a wide field of application as may be observed from the foregoing statement of its general principles. The invention can best be illustrated by having reference to one specific embodiment thereof. This specific embodiment, which is only one of its many possible adaptations as will be hereinafter more particularly pointed out, pertains to the remote control of devices, such as aircraft and the like, from a control station, such a problem giving rise, not only to the need for a comparison of a commensurable property or condition in both the control station and the airplane, but also giving rise to the need for maintaining within limits at all times such properties or conditions even though one such property or condition, as for example at the control station, may be varied with the intent that a corresponding variation will occur at the controlled station.

It is a principal object of my invention to provide a method and apparatus of the character above described which is characterized by a high sensitivity without, however, requiring the employment of extremely sensitive instruments and the like.

By having reference to the specific embodiment of the invention, which is to be presently described, it is a further object of this invention to provide method and apparatus of the character described which will make possible not only the desired sensitive control, but also the accomplishment of such control by apparatus which is not only readily available, but which, not being of extreme sensitivity, may be used practically under conditions where rough usage is encountered.

It is a further object of this invention to provide a method and apparatus of the character described in which the corrective force, applied when the system determines the necessity thereof, is such that it does not decrease in intensity as the neutral point of the control system is reached, until the correction has been achieved within the desired limits.

Other objects of my invention will appear as the description proceeds.

To the accomplishment of the foregoing and related ends, said invention then comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

Fig. 1 is a schematic diagram of a remote control system for airplanes, such system comprising one embodiment of my invention which will be illustrative of its wider field of application as will be presently described.

Fig. 2 is a schematic diagram similar to Fig. 1 showing the incorporation in the system of Fig. 1 of a protective expedient preventing accidental or intentional outside interference;

Fig. 3 is a representation of the type of emission from the local airplane oscillator.

Referring now more specifically to the drawings, and more especially to Fig. 1, the system illustrated in this figure may be divided into two parts, A and B.

That part designated by the ordinal A is a schematic representation of the equipment at the ground or control station from which the airplane, carrying system B, is to be controlled. I shall first indicate the nature of the apparatus which is thus shown assembled in Fig. 1, and then follow such description with a detailed explanation of its mode of operation by having reference to several selected sets of conditions.

The control station A includes a control stick I which, for convenience, may correspond in its construction and general mode of manipulation to the control stick I' in the airplane. It will be kept in mind that it is one of the objects of this invention to provide control mechanism whereby the operator on the ground may manipulate the stick I at his station, and have the stick I' in the airplane follow precisely, and within definite and known limits, the same manipulations.

Mechanically connected with the stick I is a conventional audio frequency oscillator 2. Throughout the following description, reference will be had to certain standard radio equipment. I have not attempted to illustrate the precise construction of such pieces of equipment. At a later point in this specification, and after all of such conventional pieces of radio equipment have been identified by reference characters, I shall set forth a table in which such pieces of equipment are cross-referenced to a standard treatise on radio engineering in which the precise construction and particular mode of operation of such individual pieces of equipment is fully explained.

The oscillator 2 is mechanically connected to the stick 1 by means of a link 3. When the stick 1, or, as is now common practice, the control wheel of the airplane, is moved in one direction or other, the link 3 will cause an adjustment of the oscillator 2 so that the latter is caused to send out audio waves of different frequencies.

Generally, and in particular where apparatus such as an airplane is to be controlled, it will be necessary that the output of the oscillator be a continuous frequency spectrum from one end of its range to the other. The audio frequency output of the oscillator 2 is applied to a modulator stage 4 which modulates the output of a conventional radio frequency transmitter 5. The output of the transmitter is fed to a suitable antenna 6.

Referring to the apparatus, B, the modulated radio wave emitted by the ground station antenna 6 is received at the airplane antenna 7, and fed, if necessary, through a current limiting network 8, the purpose of which is to prevent a destructive amount of energy being applied to the radio receiver 9 when the aircraft is in the immediate vicinity of the ground station.

After passing through the current limiting network 8, a signal is impressed on a standard radio receiver 9 and, after detection, is amplified by a standard audio frequency amplifier 10. The characteristics of the current limiting network 8, radio receiver 9, and the audio frequency amplifier 10, should be such that audio signals over the entire spectrum used by the ground control stations should be amplified substantially linearly; that is, the system should comprise a high fidelity receiver system over the range of audio frequencies used.

After amplification, the signal is passed to the band pass filter 11, the cut-off points of which correspond to the extreme frequencies emitted by the ground station oscillator with the control stick in either extreme position. The incoming audio frequency signal is now passed to the heterodyne mixer stage 12 where a locally generated signal is also applied.

The locally generated signal is produced as follows: Connected to the control stick 1' of the airplane is a beat-frequency oscillator 13 by means of a link 14. One section of the beat-frequency oscillator 13 consists of an oscillator 15, the output frequency of which is capable of being varied. The other section of the beat frequency oscillator 13 consists of an oscillator 16 the output frequency of which is substantially constant except when periodically varied as described later.

The resonant circuit of oscillator 16 has connected therein a small condenser 17 in series with a single pole switch 19, and so arranged that it may be connected in shunt with the main tuning condenser 18 for one position of the switch 19.

The switch 19 is actuated by a motor driven mechanism. A motor 19a is coupled thereto by means of an eccentric arm or pitman C whereby rotation of the motor continuously in one direction will cause the switch to be alternately opened and closed.

The effect of the periodic connection of condenser 17 into the resonant circuit of the fixed frequency section of the beat-frequency oscillator is to modify the audio frequency output of the oscillator which now emits a signal for any one position of the control stick 1', periodically varying in frequency by an amount dependent on the size of the condenser 17. The output of the fixed frequency section 16 is fed through a radio frequency filter 20, in the conventional manner, to a mixer stage 21, and the low frequency heterodyne output of the mixer stage is fed to an audio frequency amplifier 22 and a band pass filter 23, all in a manner well-known in the art.

The output of the airplane beat-frequency oscillator 13 is now fed by suitable connections C to the heterodyne mixer stage 12 simultaneously with the incoming signal as heretofore described.

The heterodyne signal from mixer stage 12 is fed through a low pass filter 24 and a high pass filter 25 to an audio frequency amplifier 26. The numerical value of the cut-off point of the low pass filter 24 will be approximately equal to the difference between the lowest frequency emitted by the ground station oscillator 2, and the highest frequency emitted by the airplane oscillator 13.

The numerical value of the cut-off point of the high pass filter 25 will be approximately equal to the difference between the signals emitted by the ground station oscillator 2, and the airplane oscillator 13, for corresponding positions of the control stick. The audio frequency amplifier 26 must be capable of amplifying linearly any signals which pass through both the low pass filter 24 and the high pass filter 25. After the heterodyne signal has been amplified, it is applied to a rectifier stage 27, the output of which is fed to the coil 28 of a single-pole, double-throw relay 29.

Referring again to the motor driven switch 19, there is provided an auxiliary switch 30 connected in synchronism with switch 19, and so arranged that when switch 19 is closed, switch 30 is closed onto contact 31, and when switch 19 is open, switch 30 is closed on contact 32. Relay 29 is arranged so that when the coil 28 is energized, the switch element is closed on contacts 33, and when the coil 28 is not energized, the switch element is closed on contacts 34.

A local source of current such as a storage battery 35 is provided. The terminal 100 of the storage battery 35 is connected by means of the lead 101 to the arm of switch 30. The other terminal 102 of the battery 35 is connected by means of a lead 103 to one pair of contacts 33 and 34 of the relay 29. A lead 104 connects the other contact 34 to the contact 32 of the switch 30. A lead 105 connects the other contact 33 to the contact 31 of the switch 30. It will be observed that the coil of relay 37 is connected in series in line 104 and the coil of relay 36 is connected in series in the line 105. It will be observed that when contacts 33 of relay 29 are closed, and contact 31 of switch 30 is closed, solenoid valve coil 36 is energized; and when contacts 34 of relay 29 are closed, and contact 32 of switch 30 is closed, solenoid valve coil 37 is energized; and under all other combinations of switch and relay positions, solenoids 36 and 37 are deenergized.

Solenoid coils 36 and 37 operate to open solenoid valves 38 and 39 respectively when energized, and a double acting compressed air cylinder 40 is provided, so arranged that when valve 38 is opened by the energizing of coil 36, the airplane stick 1' is pushed forward, and when valve 39 is operated by the energizing of coil 37, the airplane stick 1' is pushed backward by means of the cable assembly generally indicated at 41.

A line for the admission of compressed air to the cylinder 40 is shown at 42, and will be connected to some suitable source of compressed air supply, not shown.

The system shown in Fig. 1 is complete as to the control of any one function of the airplane. In this case, I have chosen to illustrate the control of the stick fore-and-aft. For complete control of the airplane, provision must be made for control of the motion of the stick right-and-left, and control of the rudder bar position, in accordance with the established principles of controlling the motion of an airplane in pitch, roll and yaw. Auxiliary controls are also necessary. For example, the engine speed should preferably be controlled. Similarly, such auxiliaries as flaps, brakes, landing gear manipulating devices, and armament may require to be controlled. In such cases, additional control channels will be required, said channels being tied in after the audio frequency amplifier 10.

Two such additional control channels 106 and 107 are shown in Fig. 1 in skeleton form for the control of the motion of the stick left-and-right and for the rudder bar control. For purposes of establishing an illustrative design, the following numerical values have been assigned to the frequency of the oscillators and filters in the system shown in Fig. 1.

|  | Stick forward | Stick neutral | Stick back | Local osc. offset by— |
|---|---|---|---|---|
| Ground BFO | 1,250 | 1,600 | 1,950 | 500~ |
| Airplane BFO | 1,750 | 2,100 | 2,450 | |

|  | Stick left | Stick neutral | Stick right | Local osc. offset by— |
|---|---|---|---|---|
| Ground BFO | 2,500 | 3,200 | 3,900 | 1,000~ |
| Airplane BFO | 3,500 | 4,200 | 4,900 | |

|  | Rudder left | Rudder neutral | Rudder right | Local osc. offset by— |
|---|---|---|---|---|
| Ground BFO | 5,000 | 6,500 | 8,000 | 1,000~ |
| Airplane BFO | 6,000 | 7,500 | 9,000 | |

The figures given in the last column of the previous table headed "Local osc. Offset by" are in each instance the difference between the frequency of the signal emitted by the ground beat frequency oscillator and the airplane beat frequency oscillator.

Certain practical considerations are responsible for the choice of the frequencies. Since it is desired that the corrective control frequency and any possible positions of ground stick and airplane stick be unique, it is necessary that the range of difference frequency produced by the heterodyne mixer stage 12 should not include either the radio control signal frequency or the locally generated signal frequency. Therefore, the low pass filter, after the mixer stage 12, will have a cut-off for each channel equal to the difference between the lowest frequency generated by the oscillator 2, and the highest frequency generated by the oscillator 13.

The high pass filter 25 will have a cut-off equal to the frequency by which the local oscillator is offset from the ground station oscillator as shown in the table. It will also be apparent that it is undesirable for the highest frequency emitted by the ground station oscillator to exceed twice the lowest frequency, if the control frequencies are selected according to the above considerations. The exact values of the frequency allocations are not critical and do not constitute a part of the invention.

The band pass filter 11 will, in all cases, have cut-offs at the extreme limits of the frequency values of the oscillator 2. The purpose of the offsetting of the local oscillator by a constant number of cycles from the corresponding positions of the ground station oscillators is to provide a directive characteristic to the control system; that is, the function of the offset is to cause a discrimination between the signal produced (beyond the heterodyne mixer stage 12) by the motion of the ground control stick to a position, say, 200 cycles higher than neutral, and a similar motion to a position, say, 200 cycles lower than neutral.

The control frequency channels should preferably be separated from one another by dead spots in the audio spectrum so that the band pass filters 11 do not have to discriminate sharply between received signals.

For the study of the operation of the device, certain instantaneous positions of some of the elements thereof will be assumed. First, we will assume that the ground control stick is neutral, the airplane control stick is neutral, switch 19 is open, and switch 30 is on contact 32. This will be, for purposes of convenience, referred to hereinafter as "Condition A."

*Condition A*

The first thing we will show is that under these circumstances, the mechanism in the airplane does not tend to throw the airplane control off the neutral position. The same thing applies even if the two sticks are not in neutral, provided their positions relative to their respective neutral positions are the same. That is, if the ground control stick is in a dive position, and the airplane control stick is in the corresponding dive position, the mechanism of the airplane will not tend to change the position of the airplane stick.

For purposes of description, we will assume that the ground control oscillator delivers a note of 1600 cycles when the ground stick is in neutral, and that the output of the airplane beat frequency oscillator is 2100 cycles for the neutral position of the airplane control stick. This 2100 cycles is the basic note delivered by the airplane beat frequency oscillator. The mechanism in the airplane is arranged to change this basic note periodically by any of several means, the most convenient of which is probably to shunt a small condenser 17, similar to an ordinary radio trimmer condenser, across the tuning condenser 18 of either section of the beat frequency oscillator, but preferably across the fixed frequency tuning condenser. The reason for this preference is that under these circumstances, the addition of a fixed condenser to the tuning section will detune the fixed frequency section a constant amount, and will change the note delivered by the entire beat frequency oscillator by a constant amount, say 100 cycles, for all positions of the beat frequency oscillator.

This is not necessarily true if the variable frequency section of the beat frequency oscillator is shunted by this condenser, that is, under these latter circumstances, the note might vary, say 100 cycles, at the low frequency end of the setting, and 150 cycles at the high frequency end.

Driven in synchronism with the switch 19 which cuts the modifying condenser in and out, is another single-pole, double-throw switch 30 whose function will appear later. In operation, the 1600 cycle note emitted by the ground station oscillator is used to modulate a standard radio transmitter. The standard radio transmitter carrier is received at the aircraft antenna, and if the airplane and the transmitter are to be operated close to one another, a current-limiting network is inserted after the antenna, as the high power field in the vicinity of the transmitter might cause damage in the first stages of the radio receiver.

The signal having passed through the current limiting network 8 is impressed on a standard radio receiver, probably a good high-grade amateur communication receiver 9, and, having been detected in the radio receiver, is amplified, preferably with automatic volume control operated from the audio signal. This arrangement is different from the automatic volume control ordinarily employed in radio receivers in that the conventional control operates on the carrier in order to maintain a constant radio signal in the radio receiver prior to detection.

After amplification, the received signal is split up by means of band pass filters into the control signals required for controlling the flight path of the airplane along its three axes, and for such other controls as may be desired. We are considering only the control of the stick fore-and-aft. The band pass filter 11 for this control channel will correspond to the oscillator control limits of the ground stick oscillator. That is, only those frequencies will be effective in this channel beyond the band pass filter 11 which lie within the limits of the oscillator at the ground station corresponding to the stick fore-and-aft control, in this case assumed to be 1250 to 1950 cycles.

Since the control frequency 1600 cycles lies within the pass band of the filter 11, it is passed unattenuated to the heterodyne mixed stage 12. The output of the airplane beat-frequency oscillator, in this case 2100 cycles, is also passed to the heterodyne mixer stage. When the two signals are mixed there will appear in the output four signals, viz., the two signals which are applied to the input, a signal frequency equal to their sum, and another signal frequency equal to their difference. This is the case in all heterodyne systems. The applied signals and the signal frequency equal to the sum of the applied signals are of no value in the control of the airplane. They are, therefore, rejected by means of a low-pass filter 24 which rejects all frequencies above 1200 cycles for this particular channel. The reason for the choice of 1200 cycles is that it represents the difference-frequency corresponding to a heterodyne between a 1250 cycle note and a 2450 cycle note, the former representing the low limit of the ground oscillator, and the latter the high limit of the airplane oscillator.

Since the difference-frequency under the assumed conditions of both sticks being in the same relative position is 500 cycles, for this channel, this is passed through the low-pass filter unattenuated. This 500 cycle signal is applied to a high-pass filter, which passes all frequencies greater than 500 cycles unattenuated, and which attenuates all frequencies less than 500 cycles to a value not exceeding about 2½% of the value of signals which are not attenuated.

A high-pass filter is, of course, one which passes frequencies above its cut-off point, and which attenuates frequencies below the cut-off point. The design of the filter must be such that it will attenuate the frequencies below the cut-off point so that they will be incapable of operating any device beyond the filter, and I have assigned an arbitrary figure of 2½% because it is easy to make the relays to be operated comparatively insensitive.

The 500 cycle signal having been passed by the high-pass filter 25 is amplified by a conventional audio frequency amplifier 26 and rectified or detected by a power rectifier 27. The function of the power rectifier is to enable the use of the energy contained in the control signal for operating a direct current relay 29 by energizing its coil 28. If the energy in the 500 cycle signal were not rectified, the signal being alternating current would not be able to operate the D. C. relay 29. An arbitrary figure of 10 milliamperes of D. C. current has been assigned as the value of the current output of the rectifier. The only reason for assigning this value is that it is within the range of ordinary operating currents, and it allows us to discriminate in this discussion between conditions where no current is flowing, and where current sufficient to operate the relay is flowing.

Since under the assumed conditions current is flowing in the relay coil 28, the contacts 33 of relay 29 are closed. Now referring back to the synchronously driven switch 30, associated with the switch 19, we find that during the interval under consideration, the modifying condenser 17 is not cut into the circuit, switch 19 being on an open contact, and switch 30 being on contact 32. Since contacts 33 of relay 29 are in series with contact 31 of switch 30, there is no current flowing at the instant under consideration in any part of the network comprising contacts 33 and 34 of relay 29, contacts 31 and 32 of switch 30, and the two solenoid operating valve coils 36 and 37 which comprise the network. There is thus at the instant under consideration no tendency for the compressed air cylinder to be energized to change the position of the control stick which is assumed to be in neutral position.

The foregoing description has been given for the instantaneous condition which maintains when the ground control stick and the airplane control stick are both in neutral position, and the switch 19 is open. With both ground and airplane control sticks still in the neutral position and with motor 19a operating continuously, during the next instant (approximately one-half second later for example) the motor 19a will have closed the switch 19, and simultaneously the switch 30 will be on contact 31. This will be referred to for convenience hereinafter as "Condition B."

*Condition B*

The ground signal is the same as that outlined in Condition A, that is, the stick is in neutral and the ground oscillator is emitting a 1600 cycle note. The synchronously driven switches 19 and 30 in the airplane, however, are in the position shown in Fig. 1, that is, the modifying condenser 17 has been cut into the beat frequency oscillator tuning circuit. The beat frequency oscillator, therefore, is delivering a signal equal to 2000 cycles instead of the 2100 cycles assumed previously.

The exact value of the difference between that delivered by the airplane frequency oscillator under Condition A and under Condition B is not important, the only function of this difference in frequency being to provide a tolerance for the operation of the device.

I have assumed a 100 cycle difference in frequency when the switch 19 is cut in. This frequency may be different for the three control channels without affecting the operation of the device. The condenser 17 may change in value, and the frequency emitted by the control oscillator in the airplane may change in value, without affecting the operation of the device. The only important thing is that the note delivered by the airplane oscillator should change, when the switch 19 is closed, sufficiently to enable ordinary cheap, conventional, rugged filters to discriminate with respect to the two notes emitted.

Switch 30 synchronously driven with switch 19 is now in the 31 position. The incoming signal as before is received at the aircraft antenna, passed through 9 and 10 as a 1600 cycle signal, and following the same reasoning as before, is passed unattenuated through the band pass filter 11. However, when the 1600 cycle signal from the receiver and the 2000 cycle signal from the airplane beat frequency oscillator are applied to the mixer stage, the difference-frequency in the output of the mixer is observed to be 400 cycles instead of 500 cycles as before. The 400 cycle note is passed through the low-pass filter unattenuated. The high-pass filter, however, attenuates the 400 cycle signal so that although it has some value, the audio frequency amplifier is unable to build up the energy in the signal to a point where, after rectification, sufficient D. C. can be derived to operate the relay 29.

We will assume that a half milliampere of D. C. is applied to the closing coil of relay 29, and that the sensitivity of the relay has been adjusted by conventional methods so that a half milliampere will not lift the armature, and, therefore, the switch bar of relay 29 will not be lifted from the contacts 34. For any current to flow in the circuit of the battery, it would be necessary, for this instant of operation, for the switch bar 30 to be closed on contact 32. However, since the switch bar 30 is closed on contact 31, no current will flow in the relay coil 37.

The above description has shown, therefore, that under the conditions outlined with both sticks neutral, no tendency exists for a change in the position of the stick in the airplane. By a similar process of reasoning in which only the values of the frequencies emitted by the ground and airplane oscillators are changed, it can be shown that at any time when the two are in coincident positions no tendency exists to change the position of the stick in the airplane.

At this point we might summarize the reasons for the difference by 500 cycles of the signals respectively emitted by the ground station oscillator and the airplane station oscillator. The difference of 500 cycles is to provide a discriminating indication between a change of, for example, 100 cycles due to moving the ground stick forward, and the change of 100 cycles due to moving the ground stick backward; this will become evident in the description of what happens when the ground stick is moved forward by an amount sufficient to cause a change of 200 cycles in the frequency of the ground station oscillator.

For Condition C, we will assume the case where the ground stick has been moved forward sufficient to cause a change of 200 cycles in the frequency emitted by the ground station oscillator 2, and with the airplane stick in the neutral position, and at the instant in the cycle when switch 19 is open and switch 30 is on contact 32 (the same as in Condition A above).

Condition C

In the case assumed, the signal emitted by the ground station is 1400 cycles, and we are assuming that the stick in the airplane is in neutral. We will consider the situation under the same time circumstances as the first discussion, that is, with switch 19 open and switch 30 on contact 32. Under these circumstances, a signal of 2100 cycles is fed into the mixer together with a 1400 cycle signal from the receiver. The output of the mixer includes the difference-frequency, 700 cycles, which is passed through the low-pass filter unattenuated, and through the high-pass filter unattenuated since the signal lies between the cut-off points of each filter. The signal is amplified and rectified as before. A D. C. current of 10 milliamperes assumed is applied to the relay 29, and the switch bar of relay 29 is on contacts 33. However, no current will flow in the circuit, and accordingly relay 36 will not be energized because switch 30 is on contact 32. As before, no operation of the solenoids 36 and 37 occurs, since the switch conditions of relay 29 and switch 30 are the same as outlined previously.

Condition D is assumed to be approximately one-half second after Condition C just described, with the switch 19 in the closed position, switch 30 on contact 31 and the ground stick in the position described in Condition C and the airplane stick still in the neutral position.

Condition D

In the succeeding half second, the switches 19 and 30 being in the same respective positions as assumed in our second discussion, the oscillator output of the airplane oscillator being 2000 cycles and the incoming signal 1400 cycles, a difference-frequency of 600 cycles is produced in the mixer stage. The 600 cycle signal is passed unattenuated through the low-pass and high-pass filter, amplified and rectified as before, and the current of 10 milliamperes D. C. derived from the rectifier used to operate the relay 29. Since the relay 29 is energized, contacts 33 are closed, and since contact 31 of switch 30 is also closed, the circuit is closed, energizing te solenoid operating valve coil 36, allowing compressed air to be applied to one end of the air cylinder which, through mechanical linkages, moves the stick forward.

As soon as the position of the stick in the airplane has reached a point where, when the switch 30 is on contact 31 a signal of less than 500 cycles is delivered by the mixer stage, the relay 29 will no longer lift the armature in closed circuit 33, and under these circumstances, the energizing circuit will no longer be closed, and the stick will tend to remain in the position it has adopted, which is the same relative to its neutral position as the position of the ground stick is to its neutral position, until either the ground stick is moved or the airplane stick moves or drifts out of such relative position.

Condition E

For Condition E, the ground stick is assumed to be moved backward to a point where a signal of 1800 cycles is emitted from the ground station, the airplane stick is assumed to be in neutral, switch 19 is open, and switch 30 is on contact 32.

Under these circumstances, the output of the mixer stage is a 200 cycle note, which is attenuated on passage through the high-pass filter, and which on rectification delivers a D. C. current insufficient to operate the relay 29. Contacts 34 of relay 29 are, therefore, closed, and a circuit comprising contacts 34, contact 32 of switch 30, and solenoid 37, is closed.

In each of the foregoing conditions, it has been assumed that the airplane control stick is in the neutral position and the ground control stick either in a coincident or different position. It will be obvious that the conditions of operation which have been described will be the same for all relative positions of the plane and ground stick, whether one or both are in neutral or off-neutral positions.

When the two sticks are not in corresponding position, there is a corrective tendency on the part of the mechanism in the airplane to bring the plane stick into correspondence with the position of the ground stick.

In the description of conditions B and D, it has been stated that the airplane stick is in a neutral position, when in the case of condition D, particularly, a corrective force may have been applied. The description of the conditions has not taken into account the possible movement of the airplane stick in response to the corrective force applied during the previous instant. It is obvious that the device will operate properly regardless of whether the ground signal changes during the period when switch 19 is open, or during the period when switch 19 is closed, and it will also be obvious, from a study of the description, that corrective changes of the position of the airplane stick occur during opposite relative halves of the cycle of switch 19, depending on whether the airplane stick is forward or aft, relative to the position occupied by the ground stick.

Figure 2 is a disclosure of a modification of this system, the purpose of which is the prevention of accidental or willful interference with the operation of the device when, as may happen, a modulated carrier is received on the same frequency as the ground control transmitter, but emanating from some other transmitter in the vicinity. In particular, when the control is used for military purposes, the enemy may, by listening in on the band in which the control transmitter is operating, determine the carrier frequency, and adjust his own transmitter to emit a carrier of the same frequency on which he may modulate a random frequency, different from that employed by the original station, thus eliminating the original station as the controller. The method by which this interference may be circumvented comprises simultaneously modulating two radio transmitters having different carrier frequencies with identical signals from oscillator 2.

In Figure 2, the modulators and transmitters are shown as 50, 50a, 51, and 51a. The control equipment aboard the airplane has the same numerals assigned to it as in Figure 1 for one channel, and the same numerals with the switch, a, for the other channel. For convenience in description, items 8, 9, 10 and 11 have been grouped into a block, and similarly, items 24, 25, 26 and 27 have been grouped into a block.

For an illustration and for identification of the apparatus used between the antenna and relays 29 and 29a, reference may be had to Figure 1 and the previous portion of this description relating to such apparatus.

A single beat frequency oscillator is provided aboard the airplane, the output of which is applied to the heterodyne mixer stages 12 and 12a as described in connection with Figure 1, and the operation of the entire duplicate set of control channels up to and including relays 29 and 29a through their connections c' and c'' is as previously described. In the wiring of the relays, solenoids, and switch 30, however, the contacts of the two relays 29 and 29a are connected in series so that simultaneous operation of the two relays is required to permit the energizing of the solenoids 36 and 37. Thus, it will be seen that the legitimate control signal, being transmitted by both the control transmitters 51 and 51a, will operate the relays 29 and 29a simultaneously, and thus effect the control of solenoids 36 and 37. A single interfering signal, however, even if on the frequency of one of the control transmitter carriers, will operate only one of the relays 29 or 29a, and unless the operation happens to coincide with the desired control, no effect will be had on solenoids 36 and 37. It will, therefore, be impossible for accidental or willful interference to produce miscontrol of the airplane unless such interference comprises two transmitters operating on the same frequency as those of the control station, and modulated by identical signals different from those required for control.

It is obvious too, as an evidence of this invention, that a plurality of transmitters and control channels greater than two may be employed, the relay contacts being connected in series to prevent operation unless three or more carriers are received simultaneously.

As previously indicated, the equipment illustrated diagrammatically and referred to in general terms in the foregoing description is all more or less standard radio equipment, and for a full understanding of the precise construction and mode of operation of these various items reference may be had to the work on "Radio Engineering" by Frederick Emmons Terman, second edition, McGraw-Hill Book Company, Inc., New York (1937). In the following table are given, first, a list of the reference characters employed in the foregoing description and in the drawings in the identification of particular equipment units; second, the figure number, if any, of the Terman book illustrating such unit in greater detail; and third, the page of such book where such figure number occurs, and in certain instances, a description of the apparatus.

| Reference character | Terman Fig. No. | Terman page No. |
|---|---|---|
| 2 | 200 | 371 |
| (Various other types of audio-frequency oscillator are also suitable) | | |
| 4, 5 | 227 | 411 |
| 8 (See Fig. 5) | | |
| 9 (Conventional amateur communications receiver) | | |
| 10 | 101A | 189 |
| 11 | 42 | 88 to 92 |
| 12 | 250, 251, 252 | 450 to 452 |
| 15 (Similar to Ref. 2) | | |
| 16 (Similar to Ref. 15, with modifications shown on drawing) | | |
| 20 | 24 | 44 |
| 21 | 250, 251, 252 | 450 to 452 |
| 22 | 101A | 189 |
| 23 | 42 | 88 to 92 |
| 24 (Similar to Fig. 268f) | | 483 |
| 25 (No illustration in this text) | | |
| 26 | 101A | 189 |
| 27 | 239 | 433 |

The design of the various components adapted from Terman's text is intended to be merely illustrative as an aid in tracing the operation of the system, and it is not intended that the citation of these figures from this text are restrictive of the methods which may be employed to obtain my results; nor is it intended as a statement that the methods shown by Terman may be employed exactly as shown. Rather, it may be necessary to modify them to adapt them to use in this invention, but such modifications are apparent to those skilled in the art.

In Figure 3, I have illustrated the characteristics of the signal emitted by the airplane oscillator. From the following description of Figure 3, the wider application of my invention than its restricted application on remote control airplanes, will become apparent to those familiar with the art.

In Figure 3, the horizontal axis of the graph is a time axis, and the graduations along the horizontal axis are marked according as the switch 19 is opened or closed at the time under consideration. When the switch 19 is open, the frequency emitted by oscillator 13 which is dotted along the vertical ordinate of the graph will be higher than the frequency emitted when switch 19 is closed. Thus, for any one setting of the control stick 1', a periodically varying frequency will be emitted by oscillator 13. The variation in the emitted frequency will be of the order of 100 cycles when the switch is closed. This 100 cycle variation in frequency is constant approximately at all positions of the control stick 1'. The basic frequency, that is, the frequency of the oscillator 13 when condenser 17 is out of the circuit, will vary according to the position of the control stick. The modified frequency, that is, the frequency emitted by the oscillator 13 when condenser 17 is connected into the circuit, will likewise vary as the position of the control stick 1 is varied; and the modified frequency will, for all positions of the control stick, be approximately 100 cycles lower than the basic frequency.

I have indicated on the drawings, and elsewhere in the specification, that the approximate period of the motor driven switch is one second. It will be appreciated that the exact value of this period is a matter for the judgment of the designer. The period should not be so short that switching difficulties will be encountered due to the mechanical inertia or difficulty in keeping switch 30 in synchronism with switch 19; and the period should not be so long that the aircraft flies for an appreciable length of time in an undesired direction without a corrective tendency on the part of the mechanism.

In an analysis of the control system, it will be seen that we have here two variables, the position of the ground stick, and the position of the airplane stick; that each of these variables has a common parameter, for example the frequency of the audio frequency signals emitted by the ground and aircraft oscillators respectively; that this parameter is a function of the respective positions of the sticks; that these two functions are being constantly compared as to magnitude by the cyclic variation of the parameter of one of them, that is, the airplane control stick oscillator; and that the comparison of the two functions of the parameter is utilized to obtain a corrective force for changing the position of the airplane control stick. It is obvious that the principle here enunciated is of wide application. Retaining the airplane control system as a basis, it is obvious that the method of varying the ground station oscillator need not be similar to the motion of the stick in the airplane. For example, a wheel may be used on the ground to affect motion of a stick in the airplane.

It is obvious that the cyclically varied signal may originate at either the control station or the station to be controlled provided there are means for synchronizing the signal varying mechanism with the relay 29.

As readily seen, analogous conditions may be controlled similarly where there is in general a variable factor at one point which is to be correlated to and controlled by suitably varied controlling means at another point, with transmission of signals between.

Other modes of applying the principle of the invention may be employed, change being made as regards the details described, provided the features stated in any of the following claims or the equivalent of such be employed.

I, therefore, particularly point out and distinctly claim as my invention:

1. In apparatus for the comparison of two commensurable properties, within a predetermined range of variation of a parameter thereof, the combination of means for selecting from one a standard of value and means for simultaneously comparing together values indicated by the two respectively while cyclically varying the value of the parameter of one of said properties and means for determining whether the parameter of the other property lies within such range.

2. In apparatus for the comparison of two commensurable properties, within a predetermined range of variation of a parameter thereof, the combination of means for selecting from one a standard of value and means for simultaneously comparing together values indicated by the two respectively while cyclically varying the value of the parameter of one of said properties over said predetermined range and means for determining whether the parameter of the other property lies within such range.

3. In apparatus for the comparison of two commensurable properties, the combination of means for selecting from one a standard of value and means for simultaneously comparing together values indicated by a common characteristic of the two respectively while cyclically varying a characteristic of one of said properties over a predetermined range, and means for determining whether a characteristic of the other property bears a particular relationship to such range.

4. In apparatus for the correlation of two commensurable properties, within a predetermined range of variation of a parameter thereof, the combination of means for selecting from one a standard of value and means for simultaneously comparing together values indicated by the two respectively while cyclically varying, from a normal, the value of the parameter of one of said properties and means for adjusting the normal value of the parameter of one of said properties so that the said range of cyclic variation of the magnitude of the parameter of one of said properties includes the magnitude of the parameter of the other of said properties.

5. In apparatus for the correlation of two commensurable properties, within a predetermined range of variation of a parameter thereof, the combination of means for selecting from one a standard of value and means for simultaneously comparing together values indicated by the two respectively while cyclically varying, from a normal, the value of the parameter of one of said properties, and means for adjusting the said normal and accordingly the said range of cyclic variation so that such range includes the parameter of the other of said properties.

6. In apparatus for the correlation of two commensurable properties, within a predetermined range of variation of a parameter thereof, the combination of means for selecting from one a standard of value and means for simultaneously comparing together values indicated by the two respectively while cyclically varying the value of the parameter of one of said properties and means for adjusting the value of the parameter of the other of said properties so as to bring the same within the said range of cyclic variation.

7. In apparatus for the correlation of two commensurable properties, within a predetermined range of variation of a parameter thereof, the combination of means for selecting from one a standard of value and means for simultaneously comparing together values indicated by the two respectively while cyclically varying the value of the parameter of one of said properties and means for adjusting the value of the parameter thus cyclically varied so as to bring the range of such variation into predetermined relationship to the parameter of other of said properties.

8. In apparatus for the comparison of two systems respectively adapted to emit electrical signals having commensurable characteristics, the combination of means for selecting from one a standard of value and means for simultaneously comparing together signals of the two systems while cyclically varying the said characteristic of one of said signals and means for determining the relationship of the said characteristic of the other signal with respect to such range of cyclic variation.

9. In apparatus for the correlation of two systems respectively adapted to emit electrical signals having commensurable characteristics, the combination of means for selecting from one a standard of value and means for simultaneously comparing together signals of the two systems while cyclically varying the said characteristic of one of said signals and means for adjusting the said characteristic of the said cyclically varied signal so as to bear a predetermined relationship to the said characteristic of the other system.

10. In apparatus for the correlation of two systems respectively adapted to emit commensurable electrical signals indicative of a state of physical adjustment of the system, the combination of means for selecting from one a standard of value and means for simultaneously comparing together signals of the two systems while cyclically varying the signal of one of such systems over a predetermined range, and means for adjusting the physical condition of said system so that the range of cyclic variation of its signal bears a predetermined relationship to the signal of the other system.

11. In apparatus for the correlation of two remote mechanical devices actuating electrical devices respectively adapted to emit alternating current signals having commensurable characteristics indicative of a state of physical adjustment of each said mechanical device, the combination of means for selecting from one a standard of value and means for simultaneously comparing together signals of the two systems while cyclically varying the commensurable characteristic of the signal of one of said devices and means for adjusting the physical condition of said last named device so that the range of cyclic variation of its signal bears a predetermined relationship to the signal of the other device.

12. In apparatus for the correlation of two remote mechanical devices actuating electrical devices respectively adapted to emit electrical signals having variable frequencies indicative of different states of physical adjustment of each said mechanical device, the combination of means for selecting frequencies from one as control and means for mixing together frequencies simultaneously from the two systems while cyclically varying the frequency of the signal of one of said devices over a predetermined range, and means for adjusting the physical condition of said last named device so that the range of cyclic variation of the frequency of its signal bears a predetermined relationship to the signal of the other device.

13. In apparatus for the correlation of two remote mechanical devices actuating electrical devices respectively adapted to emit electrical signals having variable frequencies indicative of different states of physical adjustment of each said mechanical device, the combination of means for selecting frequencies from one as control and means for mixing together frequencies simultaneously from the two systems while cyclically varying the frequency of the signal of one of said devices over a predetermined range and means for adjusting the physical condition of said last named device so that the range of cyclic variation of the frequency of its signal includes the signal of the other device.

14. In apparatus for correlating the physical condition of an apparatus at a remote station with the physical condition of apparatus at a control station, with each such station adapted to emit a variable frequency electrical signal indicative of the physical condition sought to be correlated, the combination of means for selecting frequencies from one as control and means for mixing together frequencies simultaneously from the two systems while cyclically varying the frequency of the signal emitted from one of said stations, and means for adjusting the physical condition of the apparatus at the last named station so that the range of cyclic variation of the frequency of its emitted signal bears a predetermined relationship to the frequency of the signal emitted from the other of said stations.

15. The process of correlating the physical condition of apparatus at a remote station with apparatus at a control station which comprises the steps of simultaneously emitting from the control station a plurality of significantly different electrical signals each indicative of the physical condition of the apparatus at the control station, receiving such signals at the remote station and generating at least one signal at the remote station variable in accordance with variations in the physical condition of the apparatus at the remote station, mixing the respective signals together, and adjusting the physical condition of the apparatus at the remote station so that its signal bears a respective predetermined relation to each of said control station signals.

16. In a remote control device, the combination with a controller at a control station and a controlled element at a remote station, of means functionally responsive to different positions of the controller for emitting significantly different signals, means at the remote station, functionally responsive to different positions of the controlled element, for emitting cyclically varied significantly different signals, and mixing them together with the signals received from the control station and means at said remote station functionally responsive to move said controlled element when a parameter of the signal emitted at the control station lies outside of the range of cyclic variation of the parameter of the signal emitted at the remote station.

17. In apparatus for correlating the position and movements of a lever in an airplane and a manually controlled lever at a ground station, the combination of means at the ground station for emitting radio signals significantly different for each position of the lever at said ground station, means actuated by the lever in the airplane for emitting cyclically varying signals significantly different for each setting of such lever, means in the airplane for receiving the radio signals emitted by the ground station and mixing them together with those generated on the airplane, and means functionally responsive to both sets of signals for moving the lever on the airplane so that a parameter of the ground station signal will lie within the range of cyclic variation of the parameter of the signal emitted on the airplane.

18. In a remote control device for correlating movable elements respectively located at a control station and a remote station, the combination of means at the control station functionally responsive to different positions of the said element at the control station for emitting radio signals including significantly different frequencies, means at the remote station functionally responsive to different positions of said element at said remote station for emitting significantly different cyclically varied radio signals, and means at said remote station combining the aforesaid sets of signals and effective to adjustably maintain the said element at said remote station at such a position that a parameter of the signal from the control station lies within the cyclic variation of the parameter of said signal generated at said remote station.

19. In a device for correlating the position of a movable arm at a remote station with the position of a movable arm at a control station, the combination of a radio transmitter including a beat frequency oscillator at the control station adapted, for various adjustments of said beat frequency oscillator, to send out radio signals including significantly different frequencies, means connecting said arm at said control station with the said beat frequency oscillator so that movement of said arm to different positions results in significantly different settings respectively of said beat frequency oscillator, means at said remote station including an adjustable beat frequency oscillator adapted upon various adjustments of the latter to generate cyclically varying radio signals of significantly different reference frequencies respectively, means connecting said arm at said remote station with said last named beat frequency oscillator whereby movement of said last named arm to different positions will adjust to different settings said last named beat frequency oscillator, means at the remote station for combining the said signal from said control station with the said signal generated at said remote station, and for setting up a signal which is a function of said combined signals, a relay energized by said latter signal, and power means controlled by said relay for moving the arm at said remote station.

JOHN J. MOYNIHAN.